G. REUBEN.
Pot and Kettle Cover.
No. 85,398.
Patented Dec. 29, 1868.
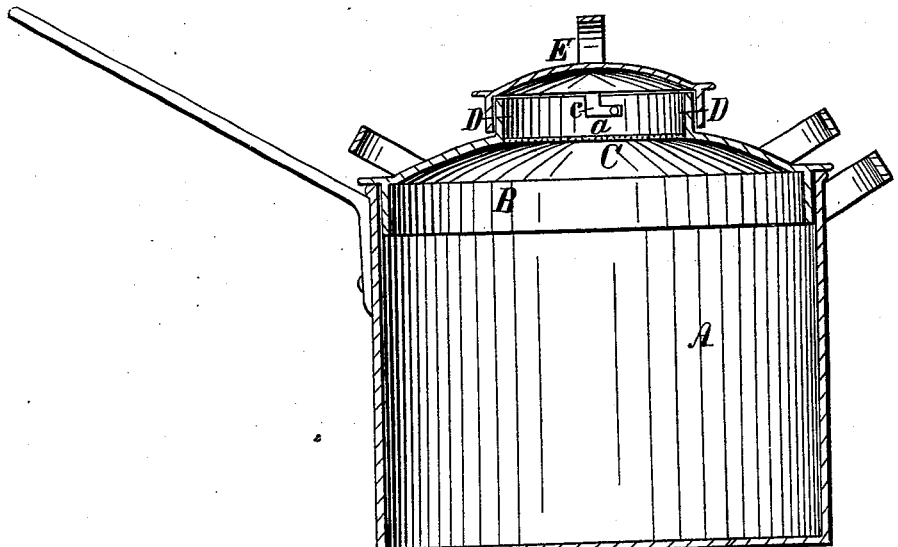
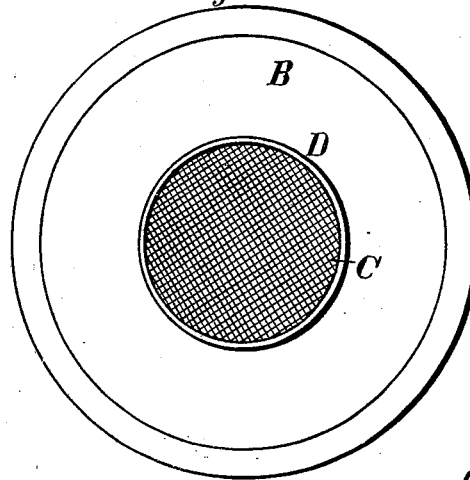

GEORGE REUBEN, OF SAN FRANCISCO, CALIFORNIA.

*Letters Patent No. 85,398, dated December 29, 1868.*

COVER FOR POTS, KETTLES, &c.

The Schedule referred to in these Letters Patent and making part of the same.

*To all whom it may concern:*

Be it known that I, GEORGE REUBEN, of the city and county of San Francisco, State of California, have invented an Improved Cover for Pots, Kettles, Saucepans, and other vessels; and I do hereby declare the following description and accompanying drawings are sufficient to enable any person skilled in the art or science to which it most nearly appertains, to make and use my said invention or improvements without further invention or experiment.

The object of my invention is to provide an improved cover for saucepans, kettles, and other culinary vessels, so constructed that the steam may be permitted to escape without danger of any foreign substance falling into the vessel. It is also a great convenience in pouring off water from the vegetables being cooked, as, by merely taking up the vessel with the hands, and turning it upside down, the water may be turned off without breaking or injuring the vegetables.

My invention consists in making a hole in the top of the cover, which is covered with wire gauze or perforated tin. A flange is made around this opening, over which a small cover is placed, and secured by means of pins on the inside of the rim, which locks into angular slots in the flange.

To more fully illustrate and explain my invention, reference is had to the accompanying drawings, forming a part of this specification, which represents, in—

Figure 1, a side sectional elevation.

Figure 2 is a plan.

A is a saucepan, of the usual construction, having the cover B.

This cover has an opening, O, in its top, which is covered with wire gauze or perforated tin, and surrounded by a flange, D.

A small cover, E, fits over this flange, which has on the inside of its rim two short pins, *a a*, opposite each other. These pins enter angular slots, *c c*, in the flange surrounding the opening, where they lock, by turning in one direction, and secure the cover E, so that by pulling it upwards the cover B is taken off, making of the whole one solid cover; and by simply turning the cover E in the opposite direction, the pins are freed from the slots, the cover E can be removed.

By this arrangement the steam from the saucepan will be allowed to escape, while all danger of dirt or other foreign substances, and especially flies, getting into the victuals is done away with, while water can be turned off easily, when desired, without burning the fingers with the steam or injuring the vegetables.

Having thus described my invention,

What I claim, and desire to secure by Letters Patent, is—

A cover for cooking and other vessels, having the opening C covered with wire gauze or perforated tin, surmounted by the flange D, the whole surmounted by the cover E, locking into the angular slots *c c*, arranged substantially as herein described.

In witness whereof, I have hereunto set my hand and seal.

GEORGE REUBEN. [L. S.]

Witnesses:
GEO. H. STRONG,
J. L. BOONE.